United States Patent [19]
Kurihara et al.

[11] Patent Number: 5,649,213
[45] Date of Patent: Jul. 15, 1997

[54] METHOD AND APPARATUS FOR REDUCING POWER CONSUMPTION IN A COMPUTER SYSTEM

[75] Inventors: Steven M. Kurihara, Palo Alto; Mark W. Insley, Sunnyvale, both of Calif.

[73] Assignee: Sun Microsystems, Inc., Mountain View, Calif.

[21] Appl. No.: 636,010

[22] Filed: Apr. 22, 1996

Related U.S. Application Data

[63] Continuation of Ser. No. 179,433, Jan. 10, 1994, abandoned.
[51] Int. Cl.$^6$ .................................................. G06F 13/00
[52] U.S. Cl. ............................................. 395/750; 364/707
[58] Field of Search ............................ 395/750; 364/707

[56] References Cited

U.S. PATENT DOCUMENTS

| | | | |
|---|---|---|---|
| 4,980,836 | 12/1990 | Carter et al. | 364/483 |
| 5,163,124 | 11/1992 | Yabe et al. | 395/750 |
| 5,179,710 | 1/1993 | Coschieri | 395/750 |
| 5,230,074 | 7/1993 | Canova, Jr. et al. | 395/750 |
| 5,237,692 | 8/1993 | Raasch et al. | 395/725 |
| 5,247,655 | 9/1993 | Khan et al. | 395/550 |
| 5,339,445 | 8/1994 | Gasztonyi | 395/750 |
| 5,361,364 | 11/1994 | Nagashige et al. | 395/750 |
| 5,361,392 | 11/1994 | Fourcroy et al. | 395/800 |

FOREIGN PATENT DOCUMENTS

| | | |
|---|---|---|
| 0368144A2 | 5/1990 | European Pat. Off. . |
| 0368144A3 | 5/1990 | European Pat. Off. . |
| 860156003 | 1/1988 | Japan . |
| 5108193 | 4/1993 | Japan . |
| 5189100 | 7/1993 | Japan . |
| 2235797 | 1/1991 | United Kingdom . |

*Primary Examiner*—Jack B. Harvey
*Assistant Examiner*—John Travis
*Attorney, Agent, or Firm*—Hickman Beyer & Weaver

[57] ABSTRACT

A computer system including a central processing unit (CPU) and a power management circuit (PMC). The CPU has an active mode where it is responsive to interrupt and direct memory access requests, and a standby mode where it is in a low power state and is not responsive to the interrupts and direct memory access requests. The PMC monitors the interrupts and direct memory access requests in the system when the CPU is in the standby mode, and causes the CPU to enter the active mode upon the detection of either an interrupt or a direct memory access request. The PMC includes: a standby register having a content which indicates either a standby or an active mode for the CPU; logic coupled to the standby register to produce a standby enabling output signal when the content of the standby register indicates a standby mode, and to produce a standby disabling output signal when the content of the standby register indicates an active mode; and logic which forces the content of the standby register to the active mode upon the detection of either an interrupt or a direct memory access request. A method for managing power consumed by a CPU of a computer system includes forcing the CPU to enter a low-power standby mode, monitoring the computer system for interrupts and direct memory access requests, and reactivating the central processing unit to an active mode where the CPU is capable of responding to the detected requests.

19 Claims, 8 Drawing Sheets

METHOD AND APPARATUS FOR REDUCING POWER CONSUMPTION IN A COMPUTER SYSTEM

This is a continuation of application Ser. No. 08/179,433 filed Jan. 10, 1994, now abandoned.

BACKGROUND OF THE INVENTION

1. Field of the Invention

This invention is generally related to smaller computer systems (such as workstations, personal computers, and laptop computers) and more particularly to computer systems provided with power management capabilities.

2. Description of the Related Art

Personal computer systems are becoming ever-more powerful. For example, there are laptop, notebook, and sub-notebook computer systems that are every bit as powerful as their desktop counterparts. Some desktop machines are achieving the computational power of workstations made just a few years ago, and workstations are now performing computational tasks that were once in the domain of mini, super-mini, and even mainframe computer systems.

The problems of power consumption and heat generation have become of greater concern as ever greater computing power is housed in ever smaller enclosures. In battery-powered computers, such as notebook computers, sub-notebook computers, personal digital assistants (PDA's), etc., power conservation is required to increase battery life and thereby increase the period of time that the computer can be used prior to recharging or replacing the batteries.

Desktop personal computers and workstations, on the other hand, are typically not battery powered. However, some form of power management is often still desirable. One reason is that a typical desktop computer system can consume several hundred watts of power per hour when it is turned on, whether or not it is being used. This energy consumption can be quite expensive, particularly in the context of large companies and other institutions which may have hundreds or even thousands of desktop computer systems turned on both day and night.

Another reason that power management may be desirable for desktop machines is that it is usually desirable minimize the heat generated by such machines. The new generation of high-speed microprocessors, often operating in a frequency range of 50 MHz or more, generate considerable heat, which must be effectively dissipated to prevent the degradation of heat-sensitive components of the computer system. If power consumption of the desktop computer system is reduced, heat generation is reduced, thereby reducing the cooling requirements for the computer system.

In the past, power consumption has been reduced by reducing the clock rate of the central processing unit (CPU) of the computer system. This reduces power consumption because the amount of power consumed by a CPU is directly related to the clock rate of the CPU. In one scenario, if the computer system starts to overheat, the clock rate to the CPU can be reduced, thereby reducing the power consumed and heat generated by the CPU. Alternatively, the clock rate of the CPU can be reduced when little or no CPU activity is detected, or when the battery voltage drops below a predetermined threshold, or by explicit user command.

Such power conservation systems are adequate for stand-alone computer systems, or for personal computer systems hooked together in simple networks. However, as will be explained in greater detail below, such power conservation techniques are not well adapted to UNIX-based network computer systems that are becoming common in the industry.

UNIX-based computer systems are interrupt-driven systems where the computer normally exists in an "idle loop" awaiting an event to be processed. If an interrupt is detected, it is handled by the CPU before the system re-enters the idle loop. A UNIX-based workstation such as a SUN SPARCstation 2 workstation can have 15 levels of interrupts, numbered from 1 to 15, where the higher the number of the interrupt the greater its priority level. As an example, if a UNIX-based computer system is processing a level 2 interrupt and a level 10 interrupt is detected by the CPU, the level 10 interrupt task will be handled prior to the completion of the level 2 interrupt task.

In FIG. 1a, a process 10 of a UNIX-based computer system of the prior art is illustrated. This process 10 is often referred to as the "UNIX kernel", i.e. is the basic, underlying process of the UNIX operating system. The process 10 begins at 12 (typically with the power-up of the system) and, in a step 14, the computer system is initialized. In particular, the interrupt tables of the system are cleared and initialized. After the initialization process of step 14, the interrupt and direct memory access (DMA) capabilities of the system are enabled in the step 16. Then, as illustrated at step 18, the basic CPU functions are performed. Events that can change or modify the normal flow of the CPU processing include interrupts and DMA requests.

DMA requests are hardware-type events which are handled by the CPU by methods well known to those skilled in the art. However, the most common type of event in a UNIX-based system is the interrupt event. The response of the CPU to an interrupt during the "perform CPU function" step 18 of FIG. 1a is illustrated in greater detail in FIG. 1b.

In FIG. 1b, process 18 begins at 20, and then immediately enters an "idle loop" comprising the "No Operation" (NOP) step 22. The microprocessor will remain in the idle loop until an interrupt 23 causes the microprocessor to jump to a master interrupt handler 24. The master interrupt handler determines the level of priority of the interrupt and hands it to an appropriate handler such as handlers 25, 26, 28, 30, and 32. By way of example, 15 levels of interrupts may be handled, ranging from a level 1 handler to a level 15 handler. Each of the handlers is associated with a particular type of function. For example, a "level 2" handler 26 is responsive to dynamic system changes, such as the insertion or removal of an Ethernet® cable. A "level 10" handler 30, in this example, is a "housekeeping" handler which is evoked every 10 milliseconds to perform basic housekeeping functions such as monitoring the scheduler queues, updating time-dependent processes (such as a clock displayed on the screen of the computer), etc. Other handlers can be used for the input/output (referred to herein sometimes as "I/O" or "peripheral") devices of the system. Some handlers, such as a "level X" handler 28 (where X is somewhere between 2 and 10 in this example), can be used to initiate user processes. For example, the level X handler can be triggered by keystrokes from a keyboard (a "level X interrupt") and, when a recognizable string is in an event queue, it can launch a user routine or program. It is important to note, however, after a handler has completely handled an interrupt (including any chain of user or other system processes) that the process control is returned to point A and the process 18 once again enters the idle loop.

As indicated by the broken-line arrows pointing to the master interrupt handler, it is possible for a handler, such as one of handlers 25-32, to be itself interrupted and process control turned over to the master interrupt handler 24. Any number of interrupts are possible up to a maximum number in an interrupt stack. After the handlers have completed their handling of all stacked interrupt events, process control is returned to point A and the process 18 once again enters its idle loop.

FIG. 1c illustrates a typical handling of an interrupt generated by an input/output (I/O) or peripheral device. The process 35 begins at 36 with a detection of an interrupt from a peripheral device and, in a step 38, the peripheral device is set up. Next, in a step 40, the data is transferred, and the process ends at step 42.

The difficulty in providing power management for a UNIX-based computer system is that the system must always be functional enough to quickly handle interrupts, DMA requests, and the like. In the example given, a level 10 or "housekeeping" interrupt is generated by the hardware of the system every 10 milliseconds, and must be handled in an expeditious manner. Therefore, reducing the frequency of the CPU clock would be a poor solution to the problem, and completely turning off the CPU without providing for the monitoring of interrupts and DMA requests could prove to be disastrous for the system, causing a failure of the UNIX kernel.

Despite the difficulty in providing power management for UNIX-based computer systems, such management is highly desirable. It is estimated that a typical small computer system may be processing data less than 1 percent of the time that it is turned on. In the case of the aforementioned UNIX-based computer system, this means that the computer spends most of its time in the idle loop comprising the NOP step 22 of FIG. 1b. The performance of a NOP step consumes just as much energy as steps having a useful purpose. It has been estimated that as many as 500,000 NOPs are executed between each level 10 interrupt of a UNIX-based system. The execution of these NOPs therefore consume the vast majority of the system's power requirements.

SUMMARY OF THE INVENTION

The present invention provides a computer system with power management that is particularly well adapted for UNIX-type workstations. The method and apparatus of the present invention monitors the system for interrupts and direct memory access (DMA) requests generated while the CPU of the system is in a low-power "standby" state, and returns the CPU to an active state when such interrupts and DMA requests are detected. The present invention therefore provides power management in a UNIX-based computer system in such a manner that the UNIX kernel is not compromised by failing to properly respond to interrupts, DMA requests, or other external events.

A computer system with power management in accordance with the present invention includes a central processing unit (CPU) and a power management circuit coupled to the central processing unit. The CPU has an active mode during which it is responsive to interrupts and direct memory access requests, and a standby mode wherein it is in a low power state and is not responsive to the interrupts and direct memory access requests. The power management circuit is operative to monitor the interrupts and the direct memory access requests when the central processing unit is in the standby mode, and causes the central processing unit to enter the active mode upon the detection of an interrupt or a direct memory access request.

A power management circuit of the present invention includes a standby register having a content which indicates whether the CPU is to be in a standby mode or in an active mode, logic coupled to the standby register to produce a standby signal when the content of the standby register indicates a standby mode, and to disable the standby signal when the content of the standby register indicates an active mode, an interrupt input, a direct memory access input, and logic coupled to the interrupt input, the direct memory access input, and the standby register which can force the content of the standby register to the active mode upon the detection of either an interrupt input or a direct memory access input. The power management circuit also preferably includes a number of device registers associated with a number of peripheral devices, wherein contents of the device registers control the power applied to the associated peripheral devices.

A method for managing the power consumed by the central processing unit of a computer system in accordance with the present invention includes the steps of providing a CPU for responding to interrupts, direct memory access requests, and a standby signal when in an active mode, and providing a power management circuit for responding to the interrupts and the direct memory access requests when the central processing unit is in a standby mode to thereby cause the central processing unit to re-enter the active mode. The step of providing a power management circuit further preferably includes providing a plurality of device registers associated with a number of peripheral devices where the contents of the device registers control the power applied to the associated peripheral devices.

In another aspect of the present invention, a method for managing power consumed by a central processing unit of the computer system includes the steps of: (a) forcing a central processing unit of a computer system to enter a low-power standby mode; (b) monitoring the computer system for external events to which the central processing unit should respond; and (c) reactivating the central processing unit to an active mode where said central processing unit is capable of responding to the external events. In a preferred embodiment of the present invention, the step of forcing a central processing unit to enter a low-power standby mode includes the steps of having said central processing unit write a standby command to a standby register of a power management circuit which functions independently of the central processing unit; and having the power management circuit enable a standby input of the central processing unit.

An advantage of the present invention is that a power management method and apparatus are provided which reduce power consumption and heat in UNIX-based computer systems without damaging the software kernel of system. The present invention is well adapted for computer systems making extensive use of interrupts and DMA requests, and for systems which are a part of a high speed network.

These and other advantages of the present invention will become apparent upon reading the following detailed descriptions and studying the various figures of the drawings.

DETAILED DESCRIPTION OF THE PREFERRED EMBODIMENTS

Figure 1A:
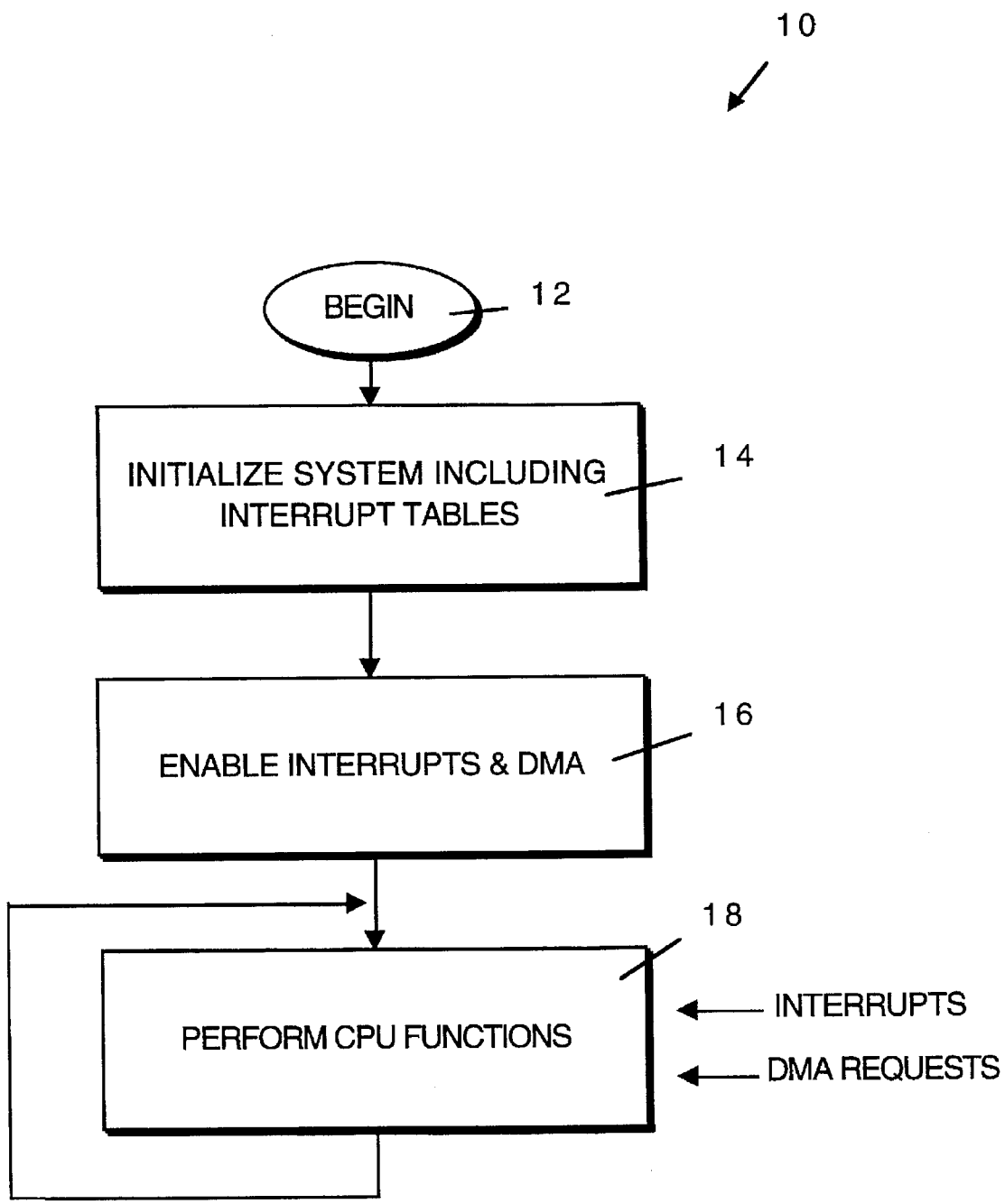
FIG. 1a illustrates the operation of a prior art UNIX kernel.
Figure 1B:
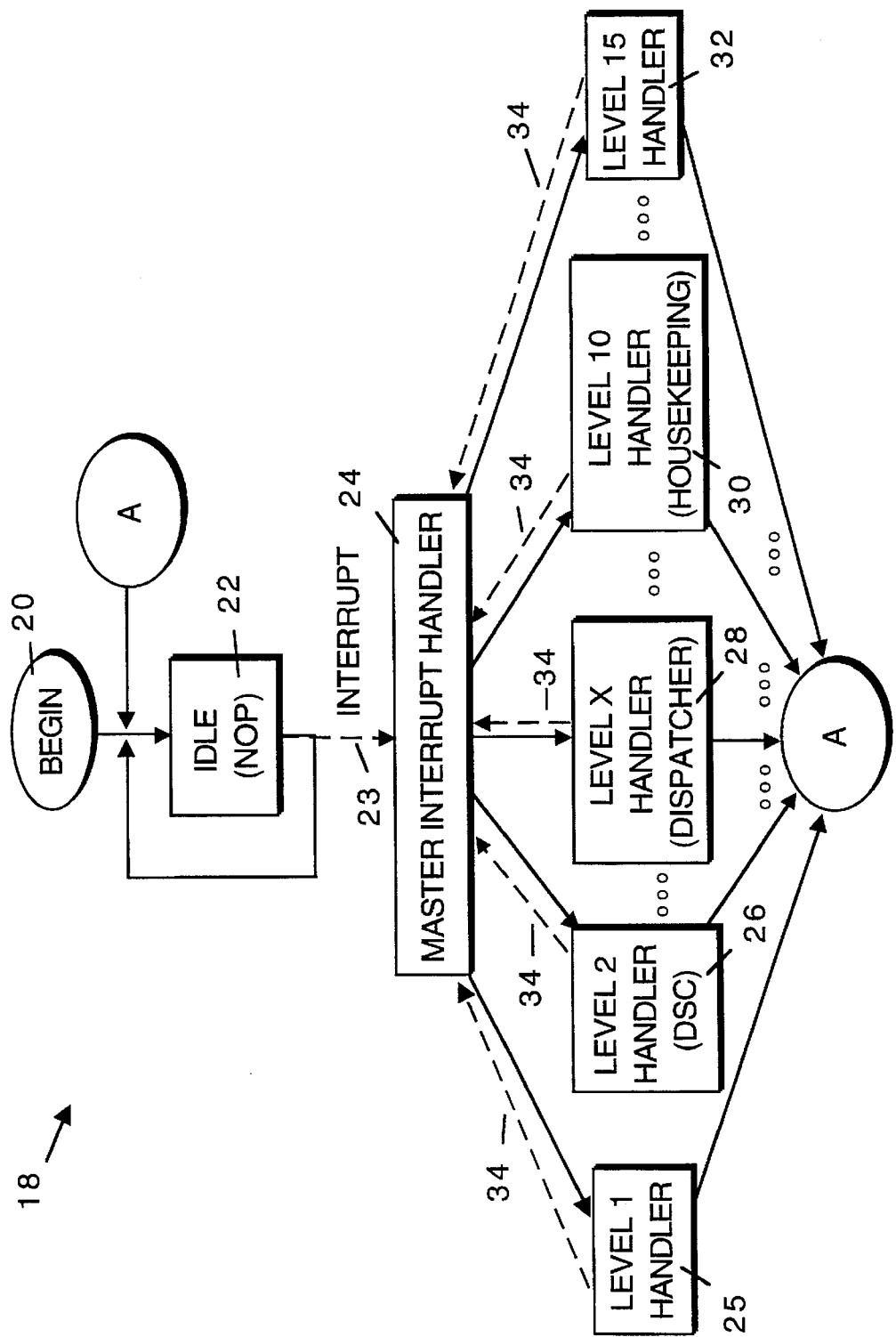
FIG. 1b illustrates a portion of the "perform CPU functions" step 18 of FIG. 1a in greater detail.
Figure 1C:
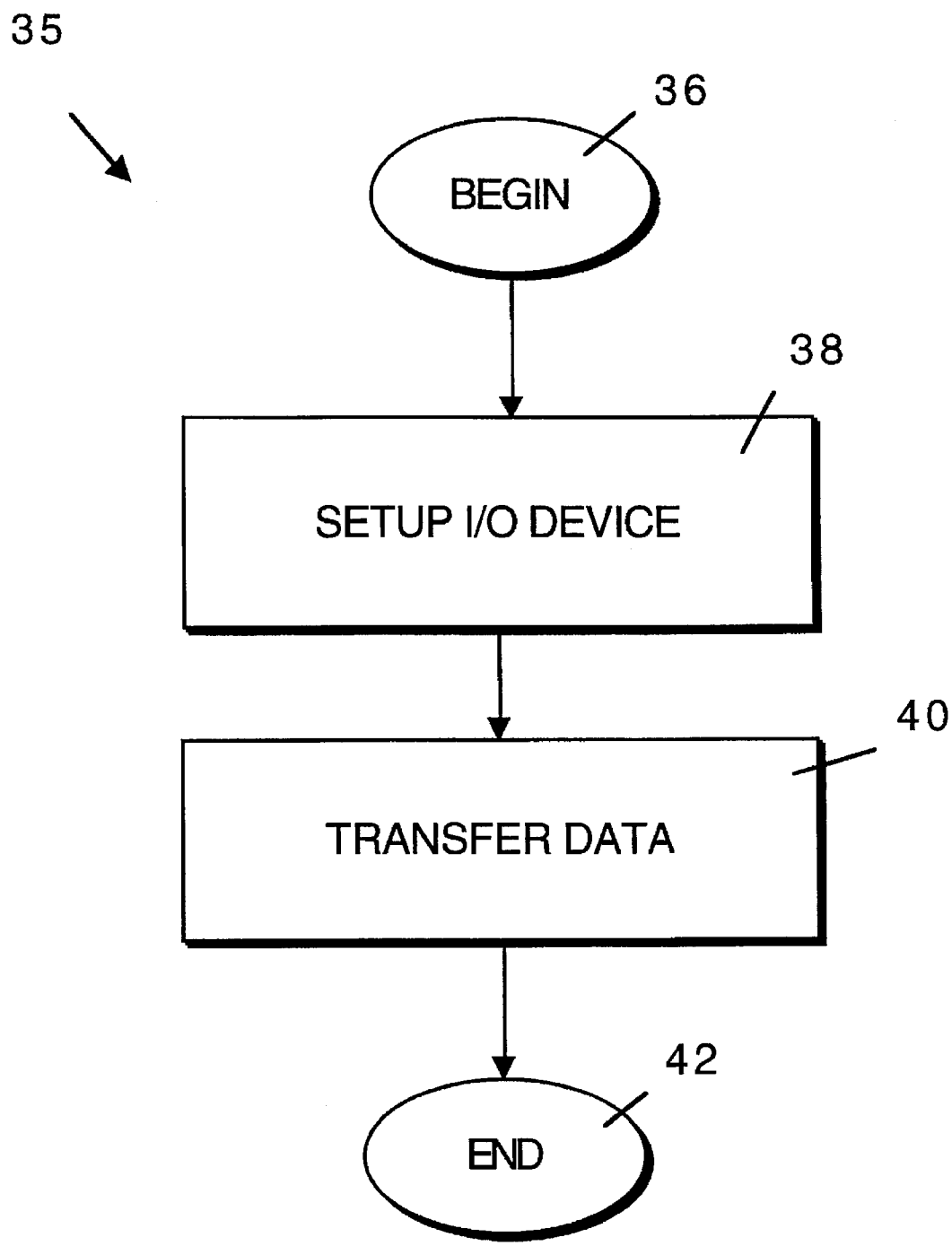
FIG. 1c illustrates the handling of an interrupt from a peripheral device in accordance with prior art methodologies.
Figure 2:
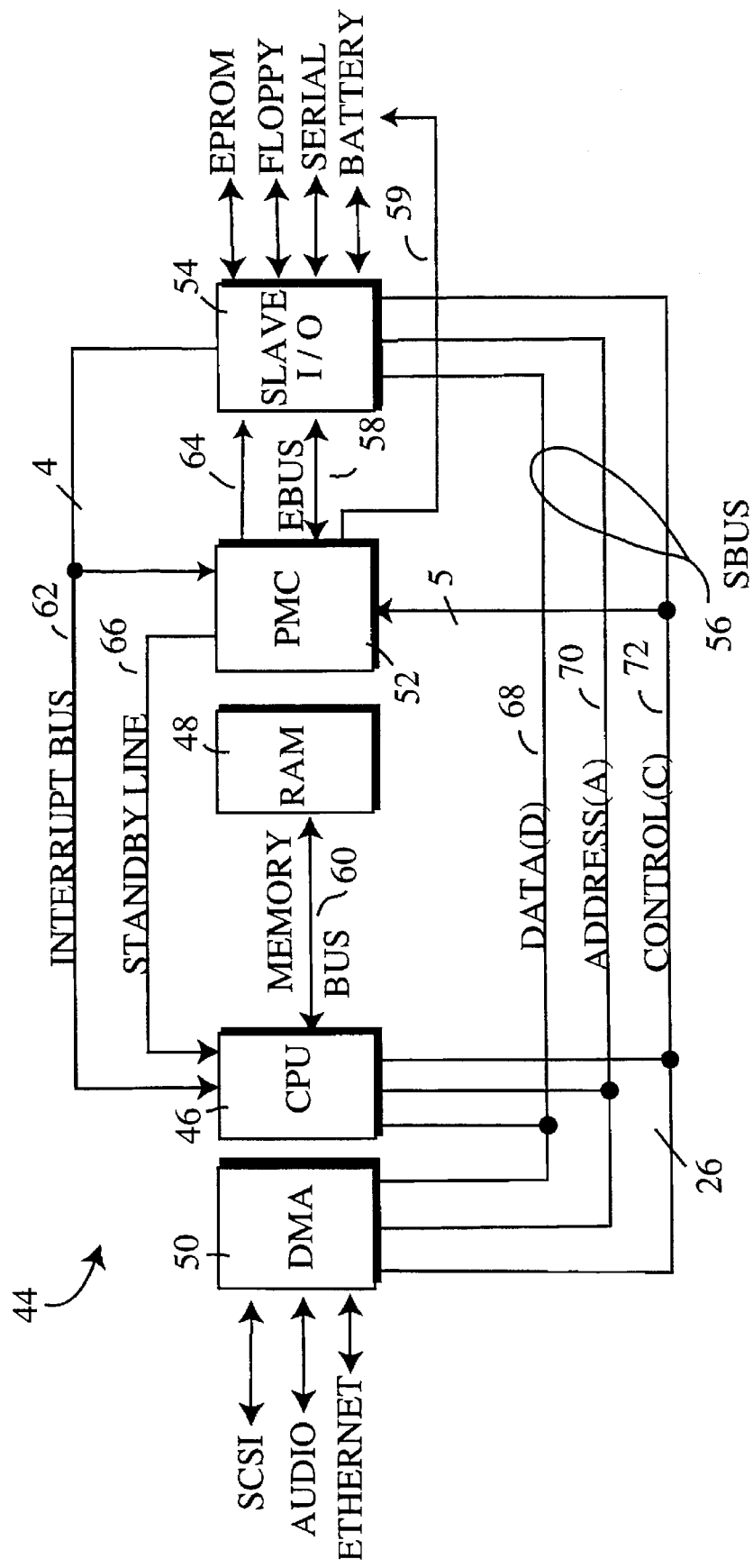
FIG. 2 is a block diagram of a computer system with power management in accordance with the present invention.

FIGS. 1a, 1b, and 1c were discussed with reference to the prior art. In FIG. 2, a computer system 44 with power management includes a CPU 46, random access memory (RAM) 48, a direct memory access (DMA) circuit 50, a power management circuit (PMC) 52, and a slave input/output (I/O) circuit 54. The various components of the computer system 44 are coupled together with a number of buses and lines including an SBUS 56, an EBUS 58, a memory bus 60, an interrupt bus 62, a level 2 interrupt line 64, and a standby line 66.

The CPU 46 is preferably a single chip microprocessor such as a SPARC® microprocessor designed by Sun Microsystems, Inc. of Mountain View, Calif. or the equivalent. The CPU 46 is coupled to the SBUS 56, the memory bus 60, the interrupt bus 62, and the standby line 66. The SBUS 56 includes a data (D) bus 68, an address (A) bus 70, and a control (C) bus 72.

The CPU 46, when in an "active" mode, is responsive to signals on its various inputs. More particularly, the CPU 46, when in its active mode, is responsive to interrupts detected on the interrupt bus 62. The interrupt bus 62 is a 4-bit bus which allows 15 levels of interrupts to be indicated. An interrupt is detected when the value on the interrupt bus is non-zero, i.e. the value on the interrupt bus is $1-$F, where the "$" designates the hexadecimal system. A value of $0 on the interrupt bus 62 indicates that there are no current interrupts on the bus 62.

The CPU 46, when in the active mode, is also responsive to DMA requests coming in over the control bus 72. The control bus 72 is a 26-bit bus, where any one of five designated DMA lines of the control bus 72 is used to indicate to the CPU that a direct memory access is desired.

As used herein, interrupts and DMA requests are considered "external events" to which the CPU should respond. They are external events because they are external to the CPU (although they may be internal to the computer system) and thus can arrive at a time that is unpredictable to the CPU. Regardless of when they arrive, the external events should be promptly dealt with by the CPU to prevent loss of data and/or potential failure of the UNIX kernel.

When in the active mode, the CPU 46 is responsive to these external events, i.e. it is responsive to both interrupts and DMA requests. However, in accordance with the present invention, the CPU 46 can be put into a "standby" or sleep mode wherein it consumes very little electrical power and during which it is not responsive to external events. This standby mode is initiated when a standby line 66 is enabled by PMC 52. As used herein, "enabled" means that a particular function is enabled, which may be indicated by either a logical high or a logical low on the line, depending upon the conventions set by the system. The term "disabled" refers to the opposite condition or logic state as "enabled."

When the standby line 66 is enabled, the CPU finishes whatever instruction it was currently processing, and then inhibits internal state transitions within the CPU, which greatly reduces power consumption. The internal CPU clock typically continues, because stopping the clock can cause restarting problems with SPARC CPUs. With other CPU types, the power consumption can be reduced by slowing or stopping the internal clock of the CPU. The implementation of "standby" and "sleep" modes for CPU's are well known to those skilled in the art.

When the standby line 66 is disabled by the PMC, the clock is restarted and the CPU 46 is made ready to execute the next operation. As described previously, this next operation is typically a "NOP" operation, since the CPU 46 is typically put into its standby mode when it is in the idle loop. However, as will be discussed in greater detail subsequently, the standby line 66 is disabled by the PMC (thereby putting the CPU 46 in its active mode) when an interrupt or DMA request is detected in the system 44. Therefore, upon reactivation, the CPU 46 typically is called upon to handle an interrupt or DMA request.

RAM 48 is coupled to CPU 46 by memory bus 60. As is well known to those skilled in the art, the memory bus 60 includes its own data, address, and control lines. The RAM 48 serves as "scratchpad" memory for the system 44 and can be accessed by the DMA circuit 50 through the CPU 46 as the CPU 46 handles the DMA request generated by circuit 50.

DMA 50 has a variety of inputs including a SCSI input, an audio input, and an Ethernet input. The unifying characteristics of these inputs is that they are coupled to very high speed devices which need rapid access to system resources. Therefore, when DMA circuit 50 detects a request to transfer data into system 44, or a request by the CPU to transfer data out of the system 44 to one of these devices, a DMA request is produced on one of the control lines of control bus 72, and the CPU 46 enters a DMA handling mode. In this DMA handling mode, the CPU 46 foregoes conventional processing, and the DMA circuit 50 is allowed direct access to systems resources such as RAM 48. In other words, during a direct memory access, the DMA circuit 50 is in control of the RAM 48 rather than the CPU 46. Conversely, when data is being transferred out of RAM 48 to, for example, the Ethernet, it is under the control of the DMA circuit 50 and not under the control of the CPU 46.

The power management circuit (PMC) 52 is coupled to the EBUS 58, the interrupt bus 62, the level 2 interrupt line 64, the standby line 66, and five lines of the control bus 72 of the SBUS 56. A major function of the PMC 52 is to monitor the interrupt bus 62 for interrupts, and the control bus 72 for DMA requests. Upon the detection of an interrupt or a DMA request, the standby line 66 is disabled to "awaken" the CPU 46 to its active mode such that the CPU 46 can handle the DMA request or the interrupt (i.e. the "external event").

Another function of the PMC 52, to be discussed in greater detail subsequently, is to power off certain peripherals. To accomplish this task, various device registers within the PMC 52 are written to by the CPU 46 to either power on or power off that device. As used herein, a "register" is a storage mechanism capable of storing one or more bits of information. In other words, a register can be a single storage element (such as a flip-flop) or a series of storage elements assembled into a logical unit. Registers in this preferred embodiment are preferably 8 bits wide, although not all bits of each registers necessarily have a function. The PMC 52 is operative to turn on or off peripheral devices such as the floppy drive via a power bus 59. For example, the PMC 52 can indicate through power bus 59 that an EPROM, floppy drive port, serial port or battery should be switched off, thereby conserving energy.

The slave I/O circuit 54 is coupled to a number of peripheral devices such as the EPROM, the floppy disk drive, the serial port, and the battery monitor. When data comes in from one of these peripheral devices, an interrupt level (1–15) is generated on the interrupt bus 62 to alert the CPU 46 (if it is active), or the PMC 52 (if the CPU is not active). The CPU 46 (when activated) can then read data from the slave I/O circuit 54 via the SBUS 56.

Figure 3:
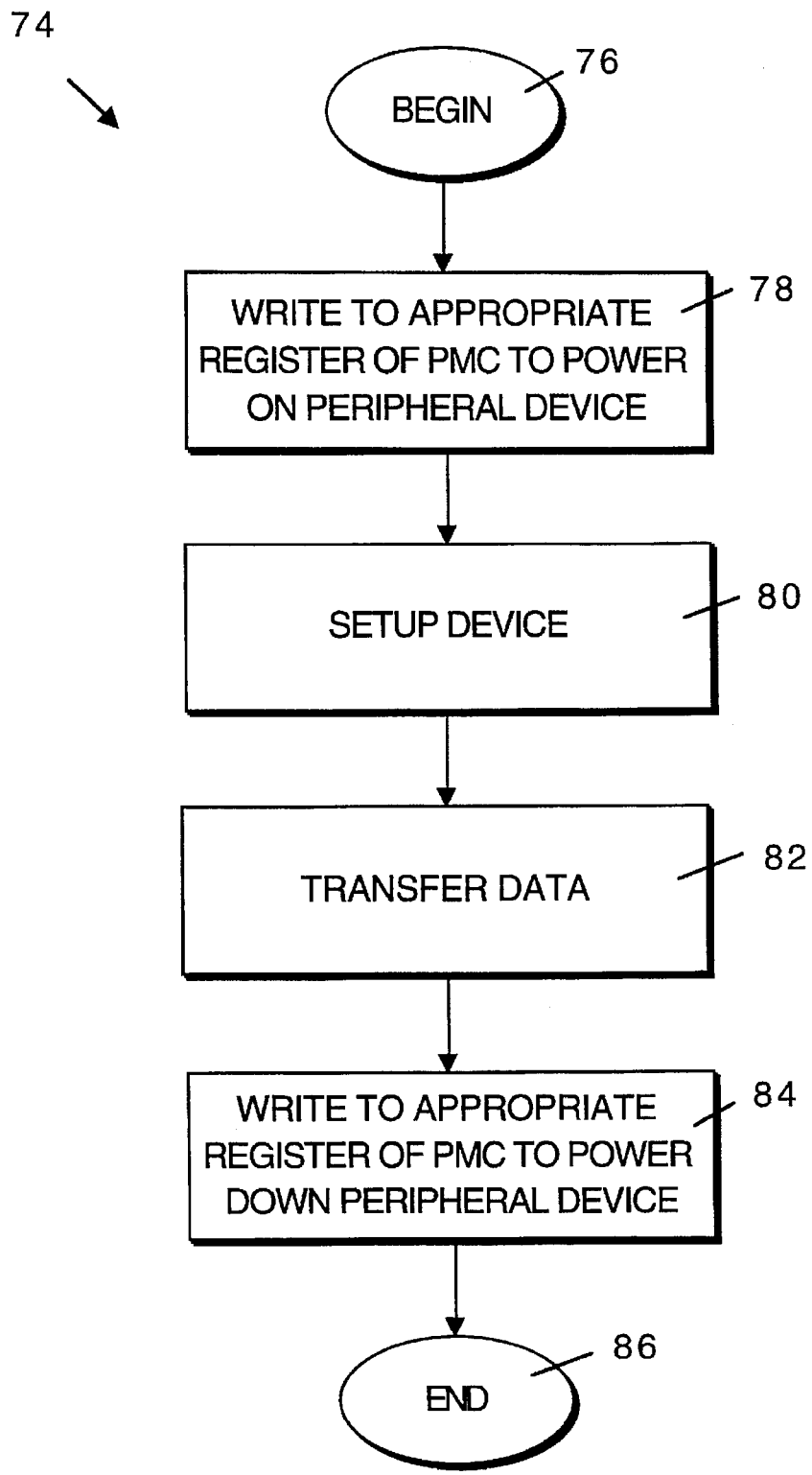
FIG. 3 illustrates a process of the present invention for managing power applied to peripheral devices.

In FIG. 3, a process 74 is illustrated to power on and off peripheral devices. This process 74 is implemented on CPU 46 and is a modification of the process 35 illustrated in FIG. 1c. The process 76 is a "patch" which modifies and enhances the functionality of the process 35 of FIG. 1c. Therefore, the patched process 76 is called when there is a need for a data transfer between the CPU 46 and a peripheral device. The process 74 begins at 76 and, in a step 78, the CPU 46 writes to an appropriate register of the PMC 52 to cause the peripheral device to be powered on via an instruction over power bus 59. Next, the peripheral device is set up in a step 80. It should be noted that this step 80 is the same step as the step 38 of process 35. Next, in a step 82, the data can be transferred. Again, this step 82 is essentially the same step as step 40 of the process 35. Finally, in a step 84, the CPU 46 writes to an appropriate register of the PMC to power down the peripheral device. The process 74 is then completed at 86

It will be appreciated, therefore, that the patch to process 35 of FIG. 1c which results in the process 74 of FIG. 3 causes a peripheral device to be powered up every time that its device driver is called up, and causes the peripheral device to power down every time that data transfer is completed. In this fashion, peripherals are only powered when they are needed, thereby conserving considerable amounts of energy and also reducing heat generated by the system.

Figure 4:
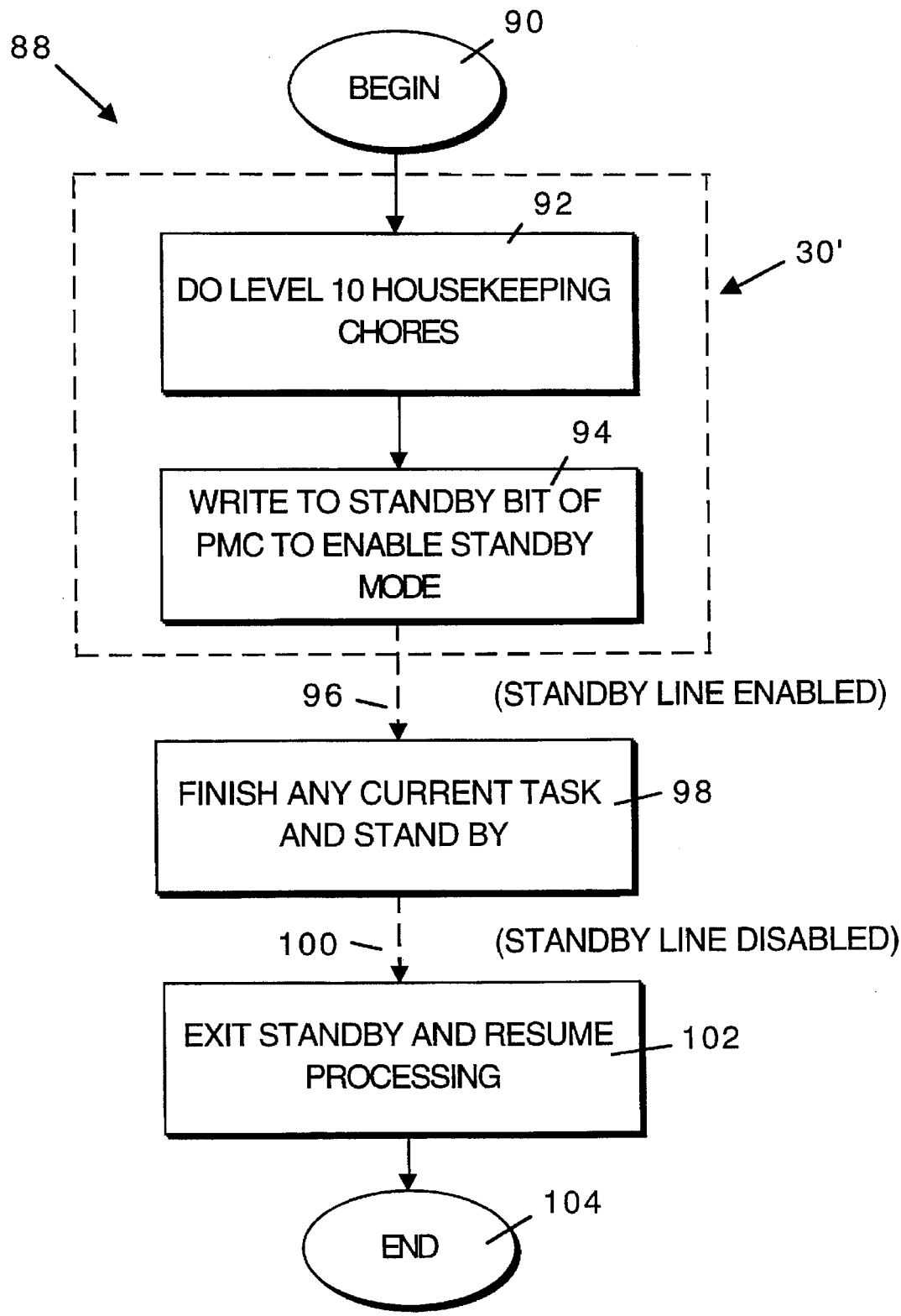
FIG. 4 illustrates a process of the present invention for forcing the CPU of the computer system illustrated in FIG. 2 into a standby mode, and for subsequently forcing the CPU into an active mode upon the detection of an external event.

FIG. 4 illustrates a process 88 running on microprocessor 46 which results in the microprocessor 46 entering the standby state. The process 88 is implemented by a process 30', which is a patch of the process 30 of FIG. 1b. As it will be recalled, the process 30 of FIG. 1b is a "housekeeping" process triggered by a level 10 interrupt on a regular basis, e.g. every 10 milliseconds. The process 88 of FIG. 4 begins at 90 and, in a step 92, the level 10 housekeeping chores are performed. These are the same housekeeping chores that were handled by the unmodified, unpatched level 10 handler 30 of FIG. 1b. Then, as a final step 94 in the patched process 30', the CPU 46 writes a standby bit to the PMC 52 to assert the standby mode. As will be discussed in greater detail subsequently, the PMC 52 responds to the writing of this standby bit by enabling the standby line 66 as indicated by the broken arrow 96. The CPU 46 then finishes any current tasks and enters the standby mode as indicated by step 98.

The CPU 46 will remain in the standby state until the standby line 66 is no longer enabled. Once the PMC 52 disables the standby line 66, as indicated by the broken line 100 in FIG. 4, the CPU 102 will exit standby and resume processing. The process 88 is then complete as indicated at 104.

It is therefore apparent that the patched process 30' of FIG. 4 will cause the CPU 46 to go into a standby mode at the end of every housekeeping cycle (i.e., every 10 milliseconds) unless some other process, interrupt, or DMA request is being handled. This ensures that full power is consumed by CPU 46 only when it is needed. In this standby mode, with the internal clock turned off, the CPU consumes a fraction of its normal energy consumption, e.g. <1% of its normal energy consumption. When the CPU is reawakened and put into its active mode as indicated by step 102 of FIG. 4, it would normally perform the next step pointed to by its program counter. Since it entered the standby mode at step 94 of FIG. 4, which is after the completion of the normal level 10 housekeeping chores of step 92, the next step would be a NOP step 22 of the idle loop shown in FIG. 1b. However, since the standby line is disabled when an interrupt, DMA request, or other external event is detected, the next step to be executed would be to handle the external event. For example, if an interrupt was the cause of the reawakening of the CPU 46, the next step to be executed would be the master interrupt handler step 24 of FIG. 1b.

Figure 5:
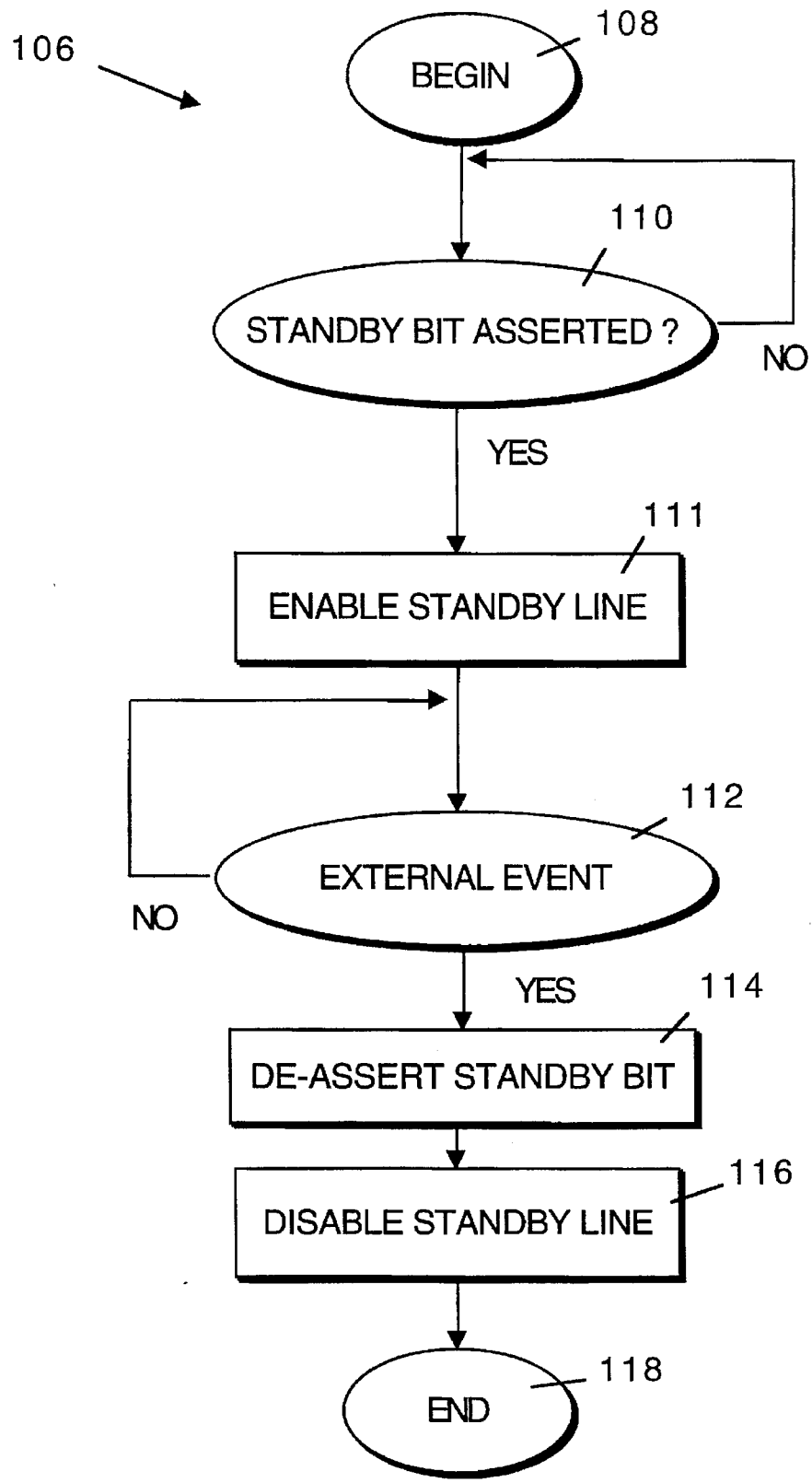
FIG. 5 illustrates the process performed by the power management circuit illustrated in FIG. 2.

In FIG. 5, a process 106 which is implemented by the power management circuit (PMC) 52 is illustrated. The process 106 begins at 108 and, in a step 110, it is determined whether the standby bit of the PMC 52 is asserted. If it is not, the process 106 goes into a wait state until the standby bit is asserted. Next, in a step 111, the standby line 66 is enabled. Next, a step 112 determines whether an external event is detected within the system 44. If not, the process 106 once again goes into a wait state awaiting an interrupt or DMA request. Once an external event is detected, the standby bit 114 is de-asserted and the signal on the standby line 66 is disabled in the step 116. The process 106 is then completed at 118.

It is therefore apparent from the process 106 that the PMC is only looking for external events when the CPU is in the standby mode. Once an interrupt or DMA request is detected, the CPU 46 is forced into the active mode to handle the interrupt or DMA request. Since the CPU 46 triggers the process 106 by asserting the standby bit in a step 110, the CPU 46 is, essentially, in control of when it is to put itself into the standby mode. Once in the standby mode, it is unable to awaken itself, and relies on the PMC 52 to disable the standby line 66 at the appropriate time to reawaken the CPU 46.

Figure 6:
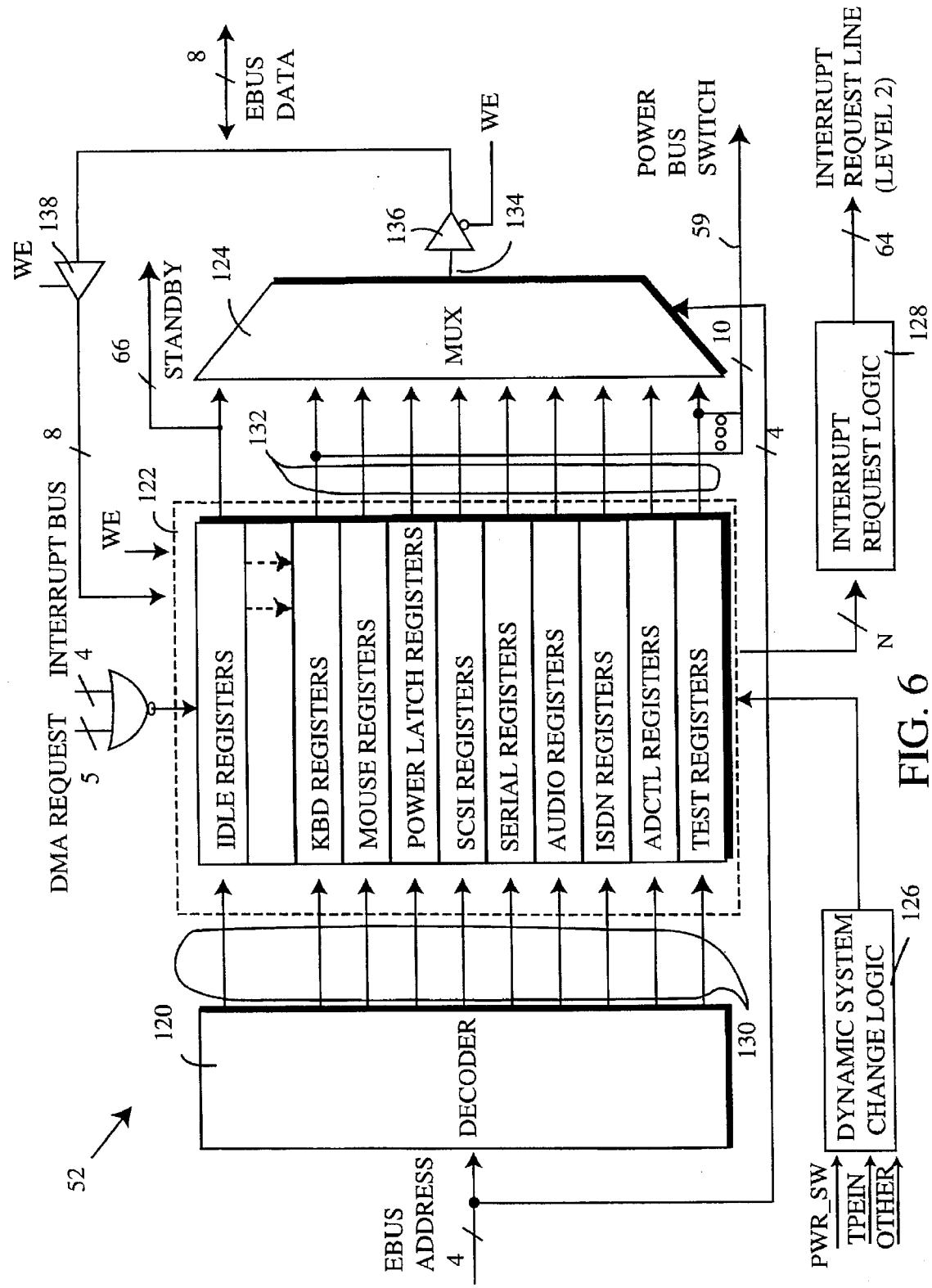
FIG. 6 is a block diagram illustrating the circuitry of the power management circuit of FIG. 2.

In FIG. 6, the circuitry of PMC 52 is illustrated in greater detail. The PMC 52 includes a decoder 120, an array of registers 122, and an output multiplexer (MUX) 124. The PMC 52 also includes dynamic system change (DSC) logic 126, and level 2 interrupt logic 128.

Four lines of the address bus of the EBUS are input into the decoder 120 and are decoded (in this embodiment) into one of eleven decoder output lines 130. These output lines are used in conjunction with a "write enable" line WE to allow data to be written into a selected register of the register array 122. Of course, a four-line address bus can address up to 16 registers, so the embodiment illustrated in FIG. 6 has an excess capacity of an additional five registers, which can be used for additional peripherals.

The register array 122 includes an idle register and a number of peripheral or I/O registers. The idle register includes a bit that is used to put the CPU 46 into its standby mode. The currently used peripheral registers include a keyboard register, a mouse register, a power latch register, an Ethernet register, an SCSI register, a serial port register, an audio port register, an ISDN register, an analog-to-digital (A/D) control register, and a test register. Of course, additional registers or different registers can also be provided.

Multiplexer (MUX) 124 receives inputs from a number of buses 132 coupled to the various registers of the register array 122. These busses are typically as wide as the registers which, in this embodiment, are 8 bits wide. The EBUS address lines are input into MUX 124 to select one of the buses 132 connected to one of the registers of register array 122 for output on an output bus 134. This output bus 134 is coupled to the EBUS data lines by an eight-bit tri-state buffer 136, which is only active when the register array 122 is not write enabled. The EBUS data lines are also coupled to the register array 122 by an eight-bit tri-state buffer 138, which is enabled by the write enable (WE) signal.

The dynamic system change (DSC) logic 126 is used to detect a change in the system during system operation. For example, the power switch, if flipped, will create an input to the DSC logic 126. Likewise, if an Ethernet cable is plugged in or removed, an input will be made on the TPEIN input line to the DCS logic 126. Other dynamic system changes can also be monitored by the DSC logic 126 as indicated by the "other" input. It is useful to monitor these dynamic system changes from a power conservation point of view, because they can affect system power consumption. For example, if an Ethernet cable is removed, a bit in the Ethernet register is set. This bit can be read by the system, which knows that it can then remove the drivers for that Ethernet cable, thereby saving power.

The interrupt logic 128 monitors the registers of register array 122 that correspond to level 2 interrupts. If a bit is set in one of those registers to indicate a level 2 interrupt, the logic 128 enables the level 2 interrupt line 64.

As is apparent from the figure, a register of register array 122 can be written to over the EBUS data line by enabling the write enable WE and addressing the appropriate register over the EBUS address bus. A register of the register array 122 can be read on the EBUS data bus by disabling the write enable WE and placing the desired register address on the EBUS address bus.

One of the 8 output lines of the idle register is the standby line 66. The standby line 66 is therefore associated with one bit (the "standby bit") of the idle register. This standby bit is set by the CPU 46 when it wishes to enter the standby mode. The standby bit is reset by the output of an OR gate having, as inputs, the 5 DMA request lines and the 4 interrupt bus lines. If any one of these lines is enabled, an "external event" has occurred, and the standby bit is reset. This causes the standby line to be disabled, and the CPU to awaken to its active mode.

A power bus comprises a number of lines coupled to a single "power bit" line of each of the device registers. When a power bit of a device register is set (by the CPU as previously described) the line is enabled and an associated peripheral device is powered off. When the power bit is reset, the associated line of the power bus 59 is disabled, and the power to the associated peripheral device is enabled.

While this invention has been described in terms of several preferred embodiments, there are alterations, permutations, and equivalents which fall within the scope of this invention. It should also be noted that there are many alternative ways of implementing both the process and apparatus of the present invention. It is therefore intended that the following appended claims be interpreted as including all such alterations, permutations, and equivalents as fall within the true spirit and scope of the present invention.

What is claimed is:

1. A computer system with power management comprising:
    a central processing unit, said central processing unit having an active mode wherein it is responsive to external events, and a standby mode wherein power is maintained to said central processing unit and said central processing unit is in a low power state and is not responsive to said external events, said central processing unit operative such that whenever said central processing unit has completed a series of basic housekeeping functions and a next operation to be performed by said central processing unit is a no operation idle step, said central processing unit sets a condition indicating that said central processing unit is currently not required; and
    a power management circuit coupled to said central processing unit, said power management circuit being operative to monitor for said external events when said central processing unit is in said standby mode, and to cause said central processing unit to enter said active mode upon the detection of an external event, said power management circuit being operative to force said central processing unit into said standby mode in response to the condition indicating that said central processing unit is currently not required, said power management circuit being operative to control power applied to at least one peripheral device.

2. A computer system as recited in claim 1 wherein said central processing unit has a standby input, and wherein said power management circuit has a standby output coupled to said standby input, said power management circuit being operative to enable said standby input to force said central processing unit into said standby mode, and to disable said standby input to force said central processing unit into said enabled mode.

3. A computer system as recited in claim 2 wherein said power management circuit is provided with a standby register, said standby register controlling said standby output and being coupled to said central processing unit by a bus, and wherein said central processing unit is operative to write to said standby register via said bus to force itself into said standby mode.

4. A computer system as recited in claim 1 wherein said external event includes an interrupt.

5. A computer system as recited in claim 1 wherein said external event includes a direct memory access request.

6. A computer system as recited in claim 1 wherein said external event is selected from the group including an interrupt and a direct memory access request.

7. A computer system as recited in claim 1 wherein said power management circuit includes:
    a standby register having a content which indicates one of a standby mode and an active mode;
    logic coupled to said standby register to produce a standby enabling output signal when said content of said standby register indicates a standby mode, and to produce a standby disabling output signal when said content of said standby register indicates an active mode;
    an external event input;
    logic coupled to said external event input and said standby register, said logic being operative to force said content of said standby register to said active mode upon the input of an external event;
    a register input coupled to said standby register, said register input being operative to write a content to said standby register which indicates said standby mode;

a plurality of device registers associated with a plurality of peripheral devices, wherein contents of said device registers controls the power applied to said associated plurality of peripheral devices, each of said device registers including a peripheral portion and a power portion, where said power portions of said device registers are operative to control power switches for said devices; and an input address bus and a decoder for decoding said input address bus and for enabling one of said standby register and said plurality of device registers.

8. A computer system as recited in claim 7 wherein said power management circuit further includes a multiplexer having a plurality of inputs coupled to said standby register and said plurality of device registers, said multiplexer having an output coupled to a data bus.

9. A power management circuit comprising:

a standby register having a content which indicates one of a standby mode and an active mode;

logic coupled to said standby register to produce a standby enabling output signal when said content of said standby register indicates a standby mode, and to produce a standby disabling output signal when said content of said standby register indicates an active mode;

an external event input;

logic coupled to said external event input and said standby register, said logic being operative to force said content of said standby register to said active mode upon the input of an external event;

a register input coupled to said standby register, said register input being operative to write a content to said standby register which indicates said standby mode;

a plurality of device registers associated with a plurality of peripheral devices, wherein contents of said device registers control the power applied to said associated plurality of peripheral devices, each of said device registers including a peripheral portion and a power portion, where said power portions of said device registers are operative to control power switches for said devices;

device power conservation logic coupled to said standby register, said devices, and said plurality of device registers, said device power conservation logic being operative to write content to said power portions of said device registers such that when a particular device is not in use, the corresponding power portion operates to turn off power to said particular device; and an input address bus and a decoder for decoding said input address bus and for enabling one of said standby register and said plurality of device registers.

10. A power management circuit as recited in claim 9 further comprising a multiplexer having a plurality of inputs coupled to said standby register and said plurality of device registers, said multiplexer having an output coupled to a data bus.

11. A power management circuit as recited in claim 9 wherein said external event is selected from the group including interrupts and direct memory access requests.

12. A method for managing the power consumed by a computer system comprising the steps of:

providing a central processing unit for responding to external events, said central processing unit being further responsive to a standby signal when in an active mode, said central processing unit entering a standby mode in response to said standby signal, said central processing unit setting a condition indicating that said central processing unit is currently not required whenever said central processing unit has completed a series of basic housekeeping functions and a next operation to be performed by said central processing unit is a no operation idle step;

providing a power management circuit for responding to said external events when said central processing unit is in said standby mode and to cause said central processing unit to enter said active mode upon a detection of an external event, said power management circuit further operative to generate said standby signal in response to the condition indicating that said central processing unit is currently not required; and providing at least one peripheral device coupled to said power management circuit, wherein said power management circuit controls power to said peripheral device by powering on said peripheral device when a driver for said peripheral device is loaded by said central processing unit when said central processing unit is in said active mode and powering down said peripheral device when said peripheral device is not in use.

13. A method as recited in claim 12 wherein said step of providing a power management circuit further provides at least one device register, and a content of said device register controls the power applied to said peripheral device.

14. A method as recited in claim 13 wherein said step of providing a power management circuit further provides a plurality of device registers, and said step of providing at least one peripheral device comprises providing a plurality of peripheral devices coupled to said power management circuit, wherein contents of said device registers controls the power applied to associated peripheral devices.

15. A method as recited in claim 12 wherein said external event is selected from the group including interrupts and direct memory access requests.

16. A method for managing power consumed by a computer system comprising the steps of:

forcing a central processing unit of a computer system to enter a low-power standby mode when said central processing unit has completed a series of basic housekeeping functions and a next operation to be performed by said central processing unit is a no operation idle step;

monitoring said computer system for external events to which said central processing unit should respond;

reactivating said central processing unit to an active mode where said central processing unit is capable of responding to said external events;

powering on a peripheral device when said peripheral device is requested for use; and powering down said peripheral device when said peripheral device is not in use.

17. A method as recited in claim 16 wherein said step of forcing a central processing unit of a computer system comprises the steps of:

said central processing unit writing a standby command to a standby register of a power management circuit which functions independently of said central processing unit; and said power management circuit enabling a standby input of said central processing unit.

18. A method as recited in claim 17 wherein said step of monitoring said computer system comprises the steps of:

said power management circuit detecting at least one of an interrupt and a direct memory access request; and writing an activate command to said standby register upon said detection.

19. A method as recited in claim 18 wherein said step of reactivating said central processing unit to a full-power mode comprises the step of said power management circuit disabling said standby input of said central processing unit.

* * * * *